US012580765B2

(12) United States Patent
Chen et al.

(10) Patent No.: US 12,580,765 B2
(45) Date of Patent: Mar. 17, 2026

(54) VERIFYING ELECTRONIC DEVICE AUTHENTICITY VIA NEAR-FIELD COMMUNICATION

(71) Applicant: Embracer Freemode Inc., Livermore, CA (US)

(72) Inventors: Chao-Ying Chen, Dublin, CA (US); Chiu-Hsiang Hsu, Taoyuan (TW); Jian-Yin Ye, Pleasanton, CA (US); Jack Guinchard, Livermore, CA (US); Lee Guinchard, Livermore, CA (US)

(73) Assignee: Embracer Freemode Inc., Livermore, CA (US)

( * ) Notice: Subject to any disclaimer, the term of this patent is extended or adjusted under 35 U.S.C. 154(b) by 190 days.

(21) Appl. No.: 18/465,894

(22) Filed: Sep. 12, 2023

(65) Prior Publication Data

US 2024/0089103 A1      Mar. 14, 2024

Related U.S. Application Data

(60) Provisional application No. 63/375,343, filed on Sep. 12, 2022.

(51) Int. Cl.
    H04L 9/32          (2006.01)
    G01S 13/76          (2006.01)
            (Continued)
(52) U.S. Cl.
    CPC ............ H04L 9/321 (2013.01); G01S 13/765 (2013.01); H04L 9/0822 (2013.01);
            (Continued)
(58) Field of Classification Search
    CPC ......... H04L 9/321; H04L 9/50; H04L 9/0822; H04L 9/0825; H04L 9/3247; H04L 9/3263
    See application file for complete search history.

(56) References Cited

U.S. PATENT DOCUMENTS

| | | | | |
|---|---|---|---|---|
| 9,369,287 | B1 * | 6/2016 | Sarvestani | ............... G07D 7/01 |
| 2016/0254918 | A1 * | 9/2016 | Liu | ..................... H04L 63/0823 |
| | | | | 713/156 |
| 2017/0222815 | A1 * | 8/2017 | Meriac | .................. H04L 9/3271 |
| 2018/0012032 | A1 * | 1/2018 | Radich | ...................... H04L 9/30 |

(Continued)

FOREIGN PATENT DOCUMENTS

| | | | | | |
|---|---|---|---|---|---|
| DE | 102010046973 | A1 | * | 3/2012 | ............. H04L 9/321 |
| TW | I705688 | B | * | 9/2020 | ........... H04L 9/0825 |
| WO | WO-2022241083 | A2 | * | 11/2022 | ............. G06Q 50/18 |

*Primary Examiner* — Darshan I Dhruv
(74) *Attorney, Agent, or Firm* — Kolitch Romano Dascenzo Gates LLP

(57) ABSTRACT

A device-verification system is configured to verify the authenticity of an electronic device using a digital signature of the electronic device verified by a certificate authority. In some examples, the electronic device includes a NFC tag storing device hardware information, device public and private keys, and a device digital signature ciphertext. A user may utilize a personal device to read the information from the NFC tag and the personal device may include a software application configured to communicate the information to a cloud-based certificate authority. The certificate authority may include a distributed system (e.g., a blockchain ledger) utilized to verify, store, and subsequently retrieve data corresponding to the electronic device. The certificate authority is configured to utilize the device digital signature to verify the authenticity of the device. In some examples, the certificate authority is configured to mint or transfer a corresponding NFT for the authenticated device after verification.

19 Claims, 7 Drawing Sheets

(51) Int. Cl.
    *H04L 9/00*      (2022.01)
    *H04L 9/08*      (2006.01)
(52) U.S. Cl.
    CPC .......... *H04L 9/0825* (2013.01); *H04L 9/3247*
        (2013.01); *H04L 9/3263* (2013.01); *H04L 9/50*
                              (2022.05)

(56)            References Cited

U.S. PATENT DOCUMENTS

| | | | |
|---|---|---|---|
| 2018/0026795 A1* | 1/2018 | Klammer ................ | G06F 21/82 |
| | | | 713/176 |
| 2018/0198628 A1* | 7/2018 | Hojsik .................. | H04L 9/3271 |
| 2019/0097793 A1* | 3/2019 | Nix .................... | H04L 63/0807 |
| 2019/0165947 A1* | 5/2019 | Hoyer .................. | H04L 63/126 |
| 2019/0253256 A1* | 8/2019 | Saab ................. | G06Q 20/3823 |
| 2020/0302432 A1* | 9/2020 | Rule .................... | G07F 7/0886 |
| 2020/0322137 A1* | 10/2020 | Arumugam .............. | H04L 9/50 |
| 2021/0281395 A1* | 9/2021 | Narayanaswami ... | H04L 9/3247 |
| 2022/0139511 A1* | 5/2022 | Osborn ................. | G16H 50/30 |
| | | | 705/2 |
| 2022/0321359 A1* | 10/2022 | Nosseir ................ | H04L 9/3226 |
| 2022/0337431 A1* | 10/2022 | Surwumwe .......... | H04L 9/3263 |
| 2022/0351195 A1* | 11/2022 | Quigley ............ | G06Q 20/1235 |
| 2023/0130182 A1* | 4/2023 | Mir ...................... | H04L 9/3247 |
| | | | 713/189 |
| 2023/0272756 A1* | 8/2023 | Patne .................... | B60K 35/28 |
| 2023/0421399 A1* | 12/2023 | Quirk .................. | H04L 9/3239 |
| 2024/0223711 A1* | 7/2024 | Quinn ................ | H04N 1/4446 |

\* cited by examiner

202  READ DEVICE HARDWARE INFORMATION

204  GENERATE DEVICE PUBLIC/PRIVATE KEYS BASED ON DEVICE HARDWARE INFORMATION

206  GENERATE CYPHERTEXT BY ENCRYPTING DEVICE PUBLIC KEY WITH CERTIFICATE AUTHORITY PRIVATE KEY

208  FLASH DEVICE NFC WITH THE DEVICE PUBLIC/PRIVATE KEYS AND CYPHERTEXT

400

402

RECEIVE DEVICE VERIFICATION
REQUEST AND ASSOCIATED DATA

404

VERIFY DEVICE DIGITAL SIGNATURE

406

VERIFY DEVICE PAYLOAD

408

COMMUNICATE VERIFICATION RESULT
AND ASSOCIATED ARTWORK

502 — RECEIVE NFT MINTING/TRANSFER REQUEST

504 — VERIFY DEVICE AUTHENTICITY

506 — DETERMINE IF NFT FOR DEVICE EXISTS ON BLOCKCHAIN

508 — MINT/ TRANSFER NFT

500

700

VERIFYING ELECTRONIC DEVICE AUTHENTICITY VIA NEAR-FIELD COMMUNICATION

CROSS-REFERENCES

The following applications and materials are incorporated herein, in their entireties, for all purposes: U.S. Provisional Patent Application Ser. No. 63/375,343, filed Sep. 12, 2022.

FIELD

This disclosure relates to systems and methods for verifying electronic device authenticity. More specifically, the disclosed embodiments relate to systems and methods for verifying the authenticity and ownership history of collectible electronic devices via near field communication.

INTRODUCTION

Due to the large scale of internet-facilitated marketplaces and the anonymity provided to third-party sellers, the authenticity of electronic devices can be difficult to verify by an untrained consumer. Furthermore, the regular purchasing and selling of electronic devices has become so ubiquitous, it has become a regular part of everyday life; no longer reserved for the propriety of electronics merchants and specialists. Accordingly, systems and methods for verifying the authenticity of electronic devices are needed.

SUMMARY

The present disclosure provides systems, apparatuses, and methods relating to device-verification systems.

In some examples, a system for verifying the authenticity of a first electronic device may include: a certificate authority comprising a server; and a second electronic device including: one or more processors; a memory; a near field communication (NFC) reader configured to read hardware information, a device public key, a device private key, and a digital signature from an NFC tag of the first electronic device; and a software application including a plurality of instructions stored in the memory and executable by the one or more processors to: compare the device private key to the hardware information; and in response to the device private key matching the hardware information, communicate a device verification request to the certificate authority, the device verification request including the digital signature; wherein the certificate authority comprises processing logic configured to receive the device verification request, verify the digital signature of the first electronic device, and communicate a verification result to the software application of the second electronic device based on the verification of the digital signature.

In some examples, a method of verifying the authenticity of a first electronic device may include: receiving, by a certificate authority, a device verification request for a first electronic device from a mobile application of a user's personal device, the device verification request including a digital signature of the first electronic device and a payload encrypted with a device private key; verifying, by the certificate authority, the authenticity of the digital signature; decrypting, by the certificate authority, the payload utilizing a device public key; verifying, by the certificate authority, the decrypted payload matches an expected value; and in response to positively verifying the authenticity of the digital signature and that the decrypted payload matches the expected value, communicating a positive verification result to the mobile application.

Features, functions, and advantages may be achieved independently in various embodiments of the present disclosure, or may be combined in yet other embodiments, further details of which can be seen with reference to the following description and drawings.

DETAILED DESCRIPTION

Figure 1:
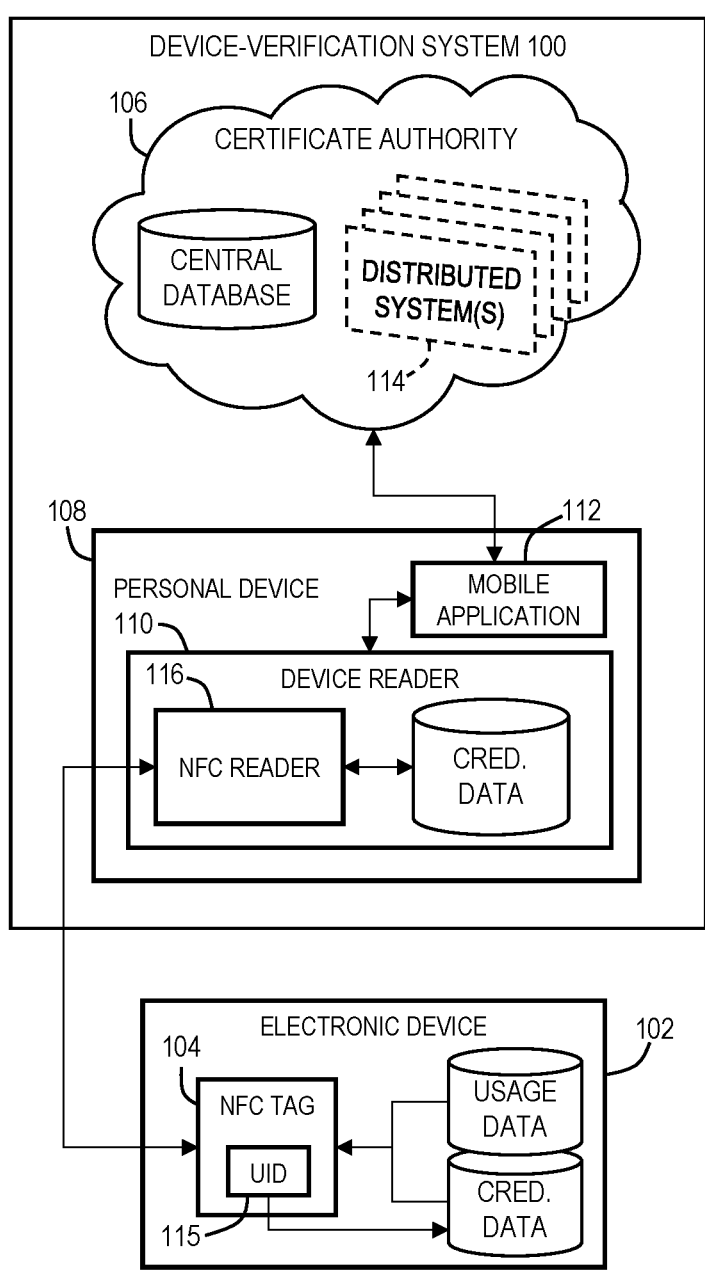
FIG. 1 is a schematic diagram of an illustrative device-verification system in accordance with aspects of the present disclosure.

Various aspects and examples of near field communication (NFC)-facilitated systems for verifying the authenticity of devices (AKA device verification systems) are described below and illustrated in the associated drawings. Unless otherwise specified, a device verification system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, systems and methods for verifying device authenticity (AKA device-verification) systems in accordance with the present teachings are configured to verify the authenticity of electronic devices, such as personal electronic devices, collectible devices, computer peripherals, video game consoles, video game controllers, and/or the like. The device-verification systems and/or methods disclosed herein may check the authenticity of the electronic device utilizing one or more of various verification methods and techniques such as asymmetric cryptography, unique hardware identifier(s) (UIDs), metadata analysis, smart contracts, blockchain technology, and/or other suitable verification methods.

In some examples, authentication of the electronic device is facilitated through the use of wireless transmission of data utilizing a suitable wireless technology/protocol, such as near-field communication (NFC), radio-frequency identification (RFID), Bluetooth, and/or the like. For example, the electronic device to be authenticated may include an NFC tag configured to communicate a digital signature of the electronic device to any suitable NFC reader via near-field communication. The digital signature communicated by the NFC tag may then be utilized by one or more other devices and/or a cloud-based certificate authority to verify the authenticity of the device.

In some examples, device-verification systems and/or methods of the present disclosure include generating device public and private keys and device digital signatures for an NFC tag of the electronic device to be utilized to verify the authenticity of the device. In some examples, the device public and private keys are determined based on specific hardware information of the electronic device. For example, the device public and private keys may be generated based on one or more unique identifiers (UIDs) of the electronic device itself and/or one or more UIDs of the device's NFC tag. In some examples, a digital signature of the device is generated by encrypting the device public key with a certificate authority private key and/or in any other suitable manner.

The device public key, device private key, and device digital signature may be generated by an NFC flashing tool configured to read the hardware information of the device and generate the keys and the digital signature based on the hardware information. The NFC flashing tool may generate the device public and/or private keys utilizing an asymmetric cryptographic algorithm (e.g., digital signature algorithm (DSA), Rivest-Shamir-Adleman algorithm (RSA), and/or any other suitable algorithm). In some examples, the NFC flashing tool generates the device digital signature by encrypting the device public key with a private key of the certificate authority. This generates a ciphertext that may be utilized as the device digital signature.

In some examples, device-verification systems may utilize a user's personal device (e.g., smartphone) having a device reader (e.g., an NFC reader) configured to read the digital signature and/or the device public and private keys of the electronic device. The user's personal device may have one or more software applications configured to communicate verification requests to the cloud-based certificate authority. In some examples, the software application(s) are configured to perform a preliminary authenticity test configured to ensure that the data read from the electronic device has not been spoofed or tampered with. In response to a positive result of the preliminary authenticity test, the software application(s) may communicate the data (e.g., hardware information, public/private keys, digital signature) to the cloud-based certificate authority to be verified.

In some examples, the cloud-based certificate authority utilizes a distributed system to verify, store, and subsequently retrieve data (AKA metadata) corresponding to the electronic device. In some examples, the distributed system comprises a peer-to-peer network (e.g., the interplanetary file system (IPFS)), a distributed digital ledger system (e.g., blockchain technology), and/or any other suitable distributed system.

The metadata of the electronic device may include one or more dynamic and/or measured values, such as historical usage data, historical power cycles, etc. In some examples, the metadata includes static and/or pre-determined values such as hardware specifications, device appearance (i.e., color, shape, etc.), manufacturing dates, batch number, etc. In some examples, the metadata includes one or more network links corresponding to locations within the distributed system(s). For example, the metadata may include an IPFS link to a visual representation of the electronic device. In some examples, the metadata includes a blockchain address corresponding to the transaction history of the electronic device.

Device-verification systems of the present disclosure may include a user's personal device having a reader configured to detect data from an NFC tag of an electronic device to be authenticated. Data detected or read by the device reader may include hardware information of the electronic device, one or more device public and private keys of the electronic device, and/or a digital signature of the electronic device. In some examples, the user's personal device has one or more mobile applications (AKA apps) configured to execute one or more preliminary verification tests to ensure that the information read by the device reader has not been spoofed or tampered with. For example, the one or more device public and/or private keys may be checked by the mobile application to determine whether the keys have been generated based on the specific hardware information of the electronic device. If the public and/or private keys do not match the hardware information, the mobile application may determine that the data has been spoofed or tampered with and display a negative authentication result on a user interface (UI) of the user's personal device. If the preliminary verification checks do not result in a negative authentication result, the one or more mobile applications may communicate a verification request to a cloud-based certificate authority and/or directly to a distributed system of the certificate authority, e.g., directly to a smart contract address in a blockchain associated with the electronic device.

With the verification request, the mobile application may communicate the device public and/or private keys, the device digital signature, and/or the hardware information of the device. In some examples, the one or more mobile applications communicate an encrypted payload that may include information regarding an address in the distributed system of the certificate authority (e.g., a blockchain address) and/or a request expiration timestamp (e.g., to prevent forgery). The payload may be encrypted utilizing the device private key by the mobile application.

Upon receiving the verification request, the certificate authority verifies the integrity of the digital signature. For example, the certificate authority may utilize the certificate authority public key to decrypt the ciphertext of the device digital signature e.g., the device public key encrypted with the certificate authority private key. In some examples, the verification step of the certificate authority occurs via a smart contract stored in a blockchain ledger. In such examples, the address of the smart contract is communicated in the encrypted payload sent by the one or more mobile applications. The smart contract includes a stored certificate authority public key used to verify the digital signature.

After decrypting the device digital signature, the certificate authority may check that the decrypted device digital signature matches the device public key. If the decrypted digital signature matches the electronic device public key, the certificate authority may communicate a positive verification result for the authenticity of the device to the mobile application. If the decrypted digital signature does not match the electronic device public key, the certificate authority communicates a negative verification result. In some examples, the certificate authority is configured to decrypt the payload utilizing the device public key and check that the decrypted payload matches expected values.

The mobile applications may then display the result on the user interface of the personal device. In some examples, if the verification result is positive, the mobile application is configured to retrieve one or more images of the authenticated device from an address in the distributed system and display the image on the user interface.

In some examples, in response to a positive verification result, a corresponding nun-fungible token (NFT) is minted in the blockchain corresponding to electronic device. In some examples, the NFT is configured to store the credential data of the electronic device, as well as a select portion of the metadata, such as an IPFS link to the visual representation of the device, the device public key, color, hardware type, production date, etc. In some examples, the minting of the NFT utilizes the smart contract already deployed to the blockchain for the electronic device. In the example in which the electronic device is sold to another user, the buyer would be able to transfer the corresponding NFT to their wallet and the transaction is recorded in the blockchain.

Aspects of device-verification systems of the present disclosure may be embodied as a computer method, computer system, or computer program product. Accordingly, aspects of the device-verification systems may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the device-verification systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of device-verification systems may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the device-verification systems may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the device-verification systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative device-verification systems as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Device-Verification System

As shown in FIG. 1, this section describes an illustrative near-field communication (NFC) facilitated system 100 for verifying the authenticity of electronic devices (AKA device-verification system 100). Device-verification system 100 is an example of the device-verification system described above.

With continued reference to FIG. 1, system 100 is utilized to verify the authenticity of an electronic device 102 (e.g., collectible devices, computer peripherals, video game consoles, video game peripherals and controllers, etc.) having an NFC tag 104 through the use of a digital signature verified by a certificate authority 106. System 100 includes a personal electronic device 108 (e.g., a smartphone) in communication with electronic device 102 by way of a device reader 110 configured to read data from NFC tag 104. Personal device 108 communicates data with cloud services, including cloud-based certificate authority 106, through the use of a mobile application 112. In some examples, certificate authority 106 comprises or is implemented on one or more servers (e.g., cloud-based servers) and/or other computers, and personal electronic device 108 comprises a client device in communication with the server. In some examples, mobile application 112 is in communication with certificate authority 106 via http requests for discrete batch transfer, and websocket and/or webRTC for continuous data streaming.

Cloud-based certificate authority 106 may include a distributed system 114 utilized to verify, store, and subsequently retrieve data corresponding to electronic device 102 (AKA metadata). In some examples, distributed system 114 comprises a peer-to-peer (P2P) network (e.g., the interplanetary file system (IPFS)). In some examples, distributed system 114 comprises a distributed digital ledger system (e.g., blockchain technology), and/or another suitable distributed system(s).

In some examples, the metadata includes one or more dynamic and/or measured values, such as historical usage data, historical power cycles, etc. In some examples, the metadata includes static and/or pre-determined values such as hardware specifications, device appearance (i.e., color, shape, etc.), manufacturing dates, etc.

The metadata may additionally include analysis of one or more data values. For example, the metadata may include analysis of the historical usage data corresponding to peak usage time, average usage time per power cycle, etc. In some examples, a user of electronic device 102 provides and/or selects one or more activities associated with the electronic device, and the metadata includes historical usage data corresponding with the associated activities. As an example, if electronic device 102 comprises a video game controller (or other peripheral), the metadata may include historical usage data corresponding to specific video games played with the peripheral.

In some examples, the metadata includes one or more network links corresponding to locations within distributed system(s) 114. For example, the metadata may include an IPFS link to a visual representation of the electronic device. In some examples, the metadata includes an IPFS link to a detailed hardware specification of electronic device 102. In some examples, the metadata includes a blockchain address corresponding to the transaction history of the electronic device.

Authentication of electronic device 102 may utilize asymmetric cryptography, unique hardware identifier(s) (UIDs), metadata analysis, smart contracts, blockchain technology, and/or other suitable verification methods and is facilitated through the use of wireless transmission of data from electronic device 102 to device reader 110. The wireless transmission of data may utilize any suitable wireless technologies/protocols, such as near-field communication (NFC), radio-frequency identification (RFID), Bluetooth, etc.

In the example depicted in FIG. 1, the wireless transmission of data is accomplished by an onboard NFC transponder 104 (AKA NFC tag) in wireless communication with an NFC receiver 116 (AKA NFC reader) of device reader 110. In some examples, device reader 110 includes an NFC transponder in place of the NFC receiver, thus resulting in a peer-to-peer communication NFC system between the electronic device and the device reader. NFC communication is an example of high-frequency RFID communication utilizing a global communication standard operating at 13.56 MHz.

NFC tag 104 utilizes radio-frequency electromagnetic waves to transfer data to NFC receiver 116. NFC tag 104 may include an integrated circuit having data storage coupled to an antenna. The integrated circuit is configured to modulate a signal such that the signal contains predetermined information including a unique identifier (e.g., a digital signature). NFC receiver 116 of device reader 110 is configured to read data from NFC tag 104 by receiving the modulated signal using a reader antenna coupled to, or integral with, NFC receiver 116.

The digital signature of electronic device 102 is generated using an asymmetric cryptographic algorithm (e.g., digital signature algorithm (DSA), Rivest-Shamir-Adleman algorithm (RSA), etc.) and stored on NFC tag 104. In some examples, a security link between the digital signature and NFC tag 104 is created by generating the digital signature based on unique identifiers (UIDs) of the physical hardware of electronic device 102. For example, a private key may be generated based on UID 115 of electronic device's 102 onboard NFC tag 104.

The digital signature may be generated and stored onto NFC tag 104 through the use of an NFC firmware flashing tool. The NFC flashing tool may be used to read hardware information from electronic device 102 and/or NFC tag 104 itself (e.g., the UID of the NFC tag) and generate a device public key and a device private key based on the hardware information. A ciphertext can then be generated by encrypting the device public key with a private key of certificate authority 106, thereby finalizing the digital signature. NFC tag 104 is then flashed with the device private key, device public key, and the ciphertext being stored in local memory on NFC tag 104.

To verify the authenticity of electronic device 102, device reader 110 reads the device public key, device private key, device hardware information, and the ciphertext from NFC tag 104 and communicates them to mobile application 112. Mobile application 112 verifies that the device private key accurately matches the device hardware information. If the device private key fails to accurately match the device hardware information, mobile application 112 alerts the user of a negative verification result.

If the device public key accurately matches the device hardware information, mobile application 112 sends a verification request to certificate authority 106, the verification request including the device public key, the ciphertext, and a device private key signed payload. The payload may include, for example, an address in distributed system 114 (e.g., a blockchain address) and a request expiration timestamp (e.g., to prevent request forgery).

Upon receiving the verification request, certificate authority 106 verifies the integrity of the digital signature. Certificate authority 106 decrypts the ciphertext using the certificate authority public key and checks the decrypted contents against the device public key. Certificate authority 106 then decrypts the device private key signed payload with the device public key to verify the contents of the payload, thereby verifying the digital signature.

In some examples, the verification step of certificate authority 106 occurs via a smart contract stored in a blockchain ledger. In these examples, the address of the smart contract is communicated in the payload. The smart contract includes a stored certificate authority public key used to verify a certificate authority private key signed device public key.

If the digital signature is verified accordingly, then certificate authority 106 communicates a positive verification result to mobile application 112. If certificate authority 106 fails to verify the digital signature, then a negative verification result is communicated to mobile application 112. Mobile application 112 then communicates the verification result (either positive or negative) to the user. If the verification result is positive, mobile application 112 additionally displays an image of electronic device 102 retrieved from an address in distributed system 114.

In addition to verifying the authenticity of the NFC-communicated data, system 100 is able to confirm that the communicated data from NFC tag 104 authentically matches the hardware of the electronic device by validating the digital signature against the hardware UID(s). In other words, system 100 verifies that the communicated data from NFC tag 104 corresponds to electronic device's 102 hardware by performing a validation check between a communicated digital signature and a known hardware UID. This provides an additional layer of security by ensuring any data communicated via NFC accurately corresponds to the physical device. Accordingly, the electronic device is protected from communication tampering such as a man-in-the-middle (MITM) attack.

Additionally, this configuration provides an additional layer of protection against hardware tampering, such as attempts to replace NFC tag 104 and/or transfer NFC tag 104 to another device. If a malicious party attempted to copy/transfer the digital signature of NFC tag 104 and use it in a new device (e.g., a different NFC), the validation check would fail, as the digital signature would not accurately correspond to the hardware UID of the new device. Accordingly, system 100 prevents the production of counterfeit devices by prohibiting the duplication of the digital signatures of legitimate devices.

In some examples a corresponding nun-fungible token (NFT) is minted in the blockchain corresponding to electronic device 102. In some examples, the NFT is configured to store the credential data of the electronic device, as well as a select portion of the aforementioned metadata, such as an IPFS link to the visual representation of the device, the device public key, color, hardware type, production date, etc. In some examples, the minting of the NFT utilizes the smart contract already deployed to the blockchain for the electronic device. In the example in which electronic device 102 is sold to another user, the buyer would be able to transfer the corresponding NFT to their wallet and the transaction is recorded in the blockchain.

As storage on public blockchains can be expensive and thus cost prohibitive, a portion of the metadata may be stored within a corresponding image in distributed system 114 via steganography. Accordingly, when a user requests the metadata of electronic device 102, mobile application 112 may fetch the image of electronic device 102 and decode the metadata from the image.

In some examples, the cloud services may include a web portal for users to easily share and compare data corresponding to their electronic device, such as their respective usage data (e.g., during a specific period of time or when it comes to certain activities), device specifications, etc.

Additionally, or alternatively, the cloud services may include a marketplace (e.g., a primary and/or secondary marketplace) for electronic devices. Users may engage with the marketplace through the mobile application. Due to the recorded transaction history and usage data for each electronic device, the marketplace provides a high level of transparency to potential purchasers.

B. Illustrative Method for Generating a Digital Signature for a Device

Figure 2:
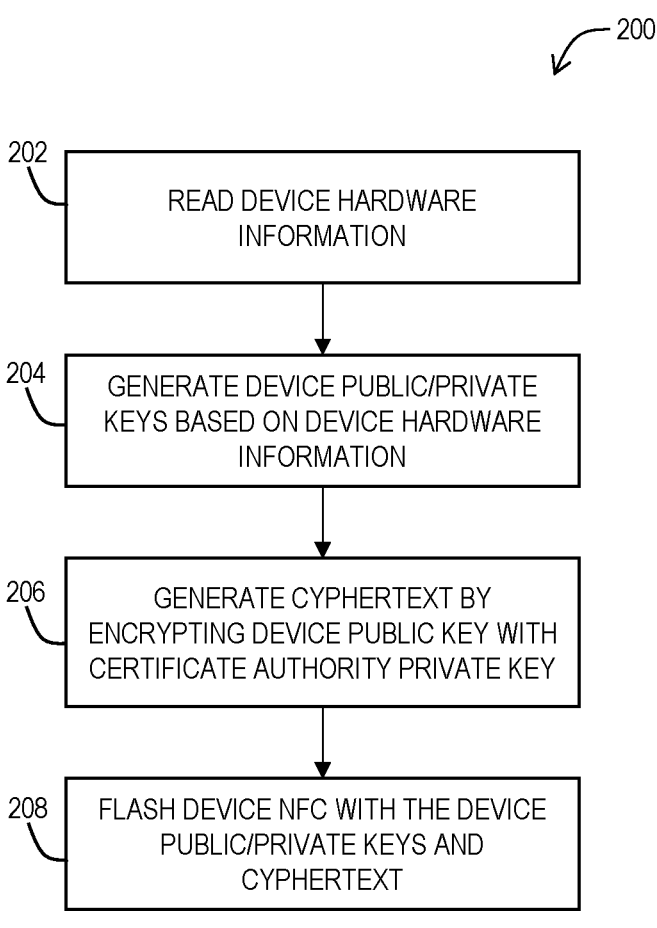
FIG. 2 is a flow chart depicting steps of an illustrative method for generating a digital signature for an electronic device in accordance with aspects of the present disclosure.

This section describes steps of an illustrative method 200 for generating a digital signature for a device; see FIG. 2. Aspects of device-verification system 100 may be utilized in the method steps described below. Where appropriate, reference may be made to components and systems that may be used in carrying out each step. These references are for illustration, and are not intended to limit the possible ways of carrying out any particular step of the method.

FIG. 2 is a flowchart illustrating steps performed in an illustrative method, and may not recite the complete process or all steps of the method. Although various steps of method 200 are described below and depicted in FIG. 2, the steps need not necessarily all be performed, and in some cases may be performed simultaneously or in a different order than the order shown.

Step 202 of method 200 includes reading hardware information from the electronic device and/or an NFC tag of the electronic device. The hardware information of the device may include a unique identifier (UID) of the physical hardware. For example, the hardware information may include a UID of the NFC tag of the device, e.g., UID 115 of NFC tag 104 in device-verification system 100, described above. In some examples, the hardware information includes a UID of the electronic controller itself. In some examples, the hardware information of the device is read by an NFC firmware flashing tool. The NFC firmware flashing tool is configured to read the hardware information of the electronic device, generate public and private keys based on the hardware information, and flash the NFC tag of the electronic device with the generated public and private keys.

Step 204 of method 200 includes generating a device public key and a device private key based on the device hardware information. For example, the NFC flashing tool may read the UID of the electronic device and/or the device's NFC tag and generate the device public and private keys based on the UIDs. The device's public and private keys may be generated by the NFC flashing tool utilizing an asymmetric cryptographic algorithm (e.g., digital signature algorithm (DSA), Rivest-Shamir-Adleman algorithm (RSA), and/or any other suitable algorithm).

The device's public and private keys are generated based on the specific hardware information (e.g., the UID of the device's NFC tag) of the device and are therefore specific to the hardware of the device. This is useful in preventing tampering, e.g., man-in-the-middle (MITM) attacks. For example, a reading device (e.g., NFC reader 116 in system 100) reading information from the NFC tag (e.g., NFC tag 104) can check the public and private keys against the UIDs of the electronic device's NFC tag. If the public and private keys do not match the UID of the device's NFC tag, this is evidence that the information communicated by the NFC tag has been tampered with. This may also prevent individuals from copying the keys and digital signature from one NFC tag onto a different NFC tag in a different device to generate a false authentication.

Step 206 of method 200 includes encrypting the device public key with a certificate authority private key. The device public key may be encrypted with the certificate authority private key by the NFC flashing tool. A cyphertext is generated based on the encrypted device public key. The cyphertext may then be utilized as a digital signature of the electronic device to facilitate verifying the authenticity of the electronic device by the certificate authority.

Step 208 of method 200 includes flashing the NFC chip of the device with the generated device public key, device private key, and the cyphertext. The NFC flashing device is utilized to flash the NFC tag with the public key, device private key, and the cyphertext. After the NFC tag is flashed, the device public key, device private key, and the cyphertext are stored in a local memory of the NFC tag and/or the memory of the electronic device having the NFC tag. The NFC tag is able to communicate the digital signature to any suitable NFC reader. The digital signature is unique to the specific hardware information of the device and facilitates verifying the authenticity of the device having the NFC tag, as described further below with reference to methods 300 and 400.

C. Illustrative Method for Verifying Electronic Device Authenticity

Figure 3:
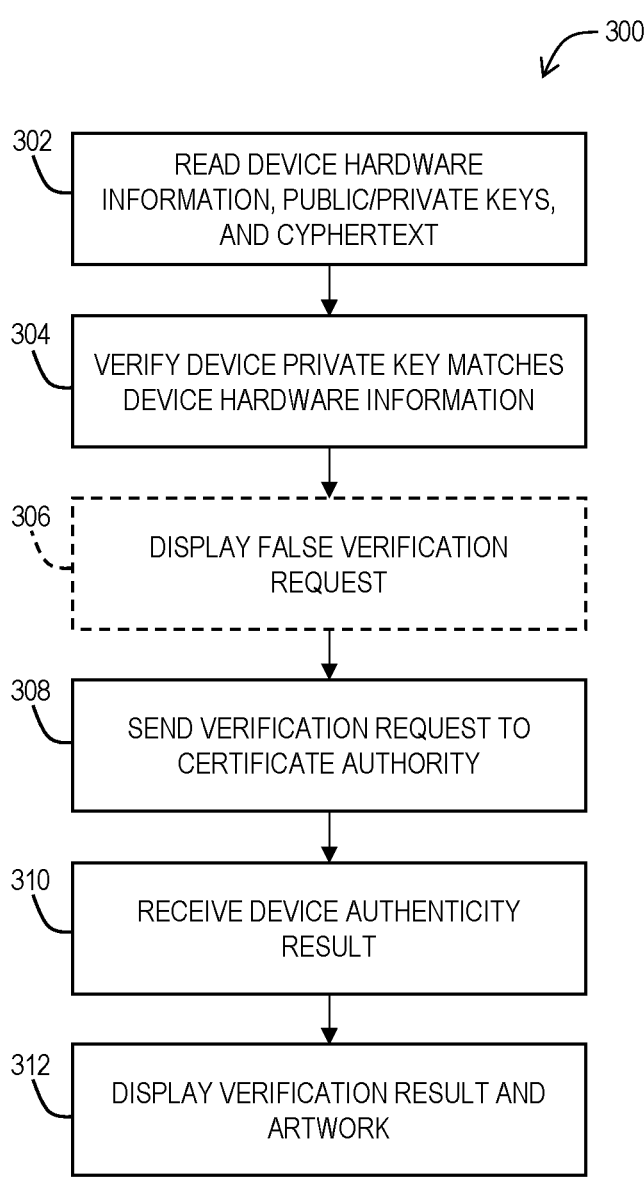
FIG. 3 is a flow chart depicting steps of an illustrative method for verifying device authenticity utilizing a user's personal device in accordance with aspects of the present disclosure.

This section describes steps of an illustrative method 300 for electronic device authenticity verification utilizing NFC; see FIG. 3. Aspects of device-verification system 100 and method 200 may be utilized in the method steps described below. Where appropriate, reference may be made to components and systems that may be used in carrying out each step. These references are for illustration, and are not intended to limit the possible ways of carrying out any particular step of the method.

FIG. 3 is a flowchart illustrating steps performed in an illustrative method, and may not recite the complete process or all steps of the method. Although various steps of method 300 are described below and depicted in FIG. 3, the steps need not necessarily all be performed, and in some cases may be performed simultaneously or in a different order than the order shown.

Step 302 of method 300 includes reading the device hardware information, device public and private keys, and device digital signature (e.g., the ciphertext of the device public key encrypted with the certificate authority private key, as described above in step 206 of method 200) from an NFC tag of the electronic device to be authenticated. In some examples, the information from the NFC tag is read by a device reader of a user's personal device, e.g., NFC reader 116 of personal device 108 in device-verification system 100, described above. In such examples, the user may wish to verify the authenticity of the electronic device having the NFC tag utilizing their personal device having the NFC reader. The user may position the personal device proximate to the electronic device and the information may be communicated from the NFC tag to the NFC reader via near-field communication. In some examples, the electronic device having the NFC tag is a video game controller. In some examples, the user's personal device having the NFC reader is a user's mobile phone.

Step 304 of method 300 includes verifying that the device private key matches the device hardware information. As described above in step 204 of method 200, the device public and private keys are generated based on the specific hardware information of the electronic device (e.g., the UID of the NFC tag and/or the UID of the electronic device itself). One or more software applications on the user's personal device (e.g., mobile application 112 of personal device 108 in system 100) may be utilized to determine that the device private key matches the device hardware information. Checking that the device private key matches the specific hardware information of the device provides a layer of security configured to prevent spoofing or tampering of data that could result in a false positive authenticity verification. For example, if the device private key is generated based on a UID of the NFC tag in step 204 of method 200, checking that the device private key matches the UID of the NFC tag ensures that a man-in-the-middle did not intercept and manipulate the data sent between the NFC tag and the NFC reader. This also prevents an individual from copying the data from the NFC tag of a first device onto the NFC tag of a second device, as the device private key would not match the hardware UID of the NFC tag of the second device.

Step 306 of method 300 includes in response to determining that the device private key does not match the hardware information of the electronic device in step 304, displaying on a user interface of the personal device a false verification of the authenticity of the electronic device. If the device private key does not match the hardware information of the electronic device, the mobile application terminates the authenticity verification procedure and may display that the verification request failed on a user interface of the user's personal device.

Step 308 of method 300 includes in response to determining in step 304 that the device private key matches the hardware information of the electronic device, communicating a verification request to a certificate authority. The certificate authority may be cloud-based and may include a distributed system configured to verify, store, and subsequently retrieve data corresponding to the electronic device (AKA metadata). The distributed system of the certificate authority may comprise a peer-to-peer (P2P) network (e.g., the interplanetary file system (IPFS)), a distributed ledger system (e.g., blockchain technology), and/or another suitable distributed system.

With the verification request, the mobile application may communicate the electronic device public and/or private keys, the device digital signature, the device hardware information, and/or a payload to the certificate authority. The payload may include an address in the distributed system (e.g., a blockchain address), a request expiration timestamp (e.g., to prevent request forgery), and/or any other suitable information. In some examples, the payload is encrypted with the device private key. Upon receiving the verification request, the certificate authority is configured to verify the integrity of the device digital signature, as described further below with reference to FIG. 4 and method 400.

Step 310 of method 300 includes receiving, by the mobile application from the certificate authority, a device authenticity result. The certificate authority is configured to verify the integrity of the device digital signature and determine the authenticity of the electronic device. The certificate authority communicates the result to the mobile application of the user's personal device.

Step 312 of method 300 includes displaying, on the user interface of the user's personal device, the device authenticity result received by the mobile application in step 310. In some examples, if the device authenticity result is positive, the mobile application is configured to retrieve an image of the electronic device from an address in the distributed system and display the image on the user interface of the personal device. The image may depict a visual representation of the electronic device. In some examples, metadata (e.g., historical usage data, historical power cycles, visual appearance, hardware specifications, etc.) for the electronic device may be stored in the image via steganography. In such examples, the mobile application may be configured to decode the metadata from the image and display the data on the user interface.

D. Illustrative method for Verifying Electronic Device Authenticity via Blockchain This section describes steps of an illustrative method 400 for verifying an electronic device digital signature by a cloud-based certificate authority; see FIG. 4. Aspects of device-verification system 100 and methods 200 and 300 may be utilized in the method steps described below. Where appropriate, reference may be made to components and systems that may be used in carrying out each step. These references are for illustration, and are not intended to limit the possible ways of carrying out any particular step of the method.

Figure 4:
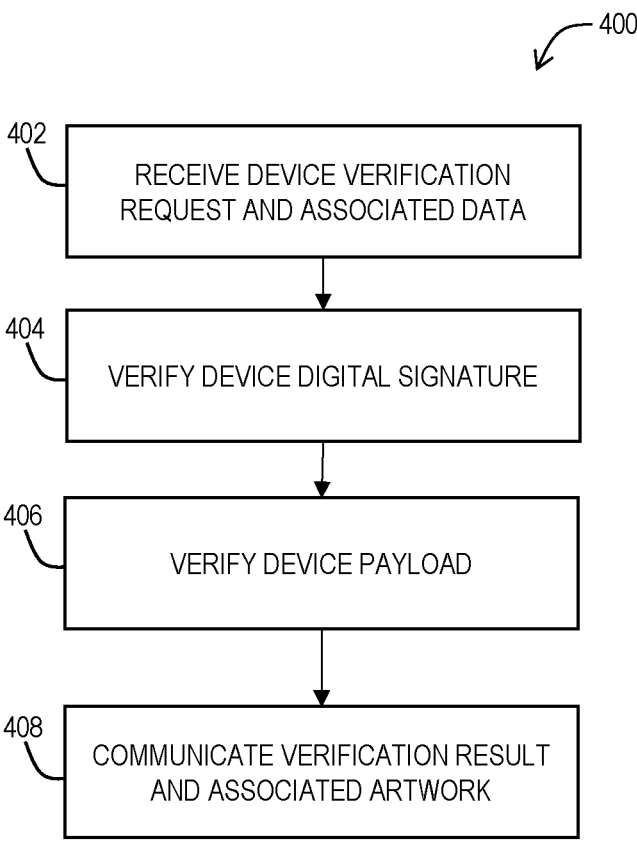
FIG. 4 is a flow chart depicting steps of an illustrative method for verifying device authenticity by a certificate authority in accordance with aspects of the present disclosure.

FIG. 4 is a flowchart illustrating steps performed in an illustrative method, and may not recite the complete process or all steps of the method. Although various steps of method 400 are described below and depicted in FIG. 4, the steps need not necessarily all be performed, and in some cases may be performed simultaneously or in a different order than the order shown.

Step 402 of method 400 includes receiving, by the certificate authority, a device verification request communicated by a mobile application of a user's personal device, e.g., the device verification request communicated in step 308 of method 300, described above. In some examples, the device verification request includes the device hardware information, device digital signature cyphertext (e.g., device public key encrypted with certificate authority private key), device public and private keys, and/or the encrypted payload. The certificate authority may include any suitable cloud-based services configured to receive the device verification request and determine an authenticity of the device based on the device information (e.g., digital signature, public/private keys, hardware information) communicated with the device verification request.

In some examples, the certificate authority may include a smart contract deployed to a blockchain ledger. In some such examples, the software application of the user's personal device may communicate the verification request directly to the smart contract in the blockchain ledger. In some such examples, the software application communicates the request to the cloud-based services of the certificate authority and the payload included in the request includes a blockchain address having the deployed smart contract. In such examples, the cloud-based services of the certificate authority may be configured to communicate the request and the device information to the blockchain address included in the payload. The smart contract is configured to receive the request and determine the authenticity of the device based on the integrity of the device digital signature and the encrypted payload.

In some examples, a smart contract is deployed to the blockchain ledger of the certificate authority for each electronic device that is sold by the certificate authority. For example, the certificate authority may manufacture and/or sell video game controllers and deploy a smart contract to a specific address in the blockchain for each video game controller that is manufactured and/or sold. This facilitates the individual that buys the controller being able to authenticate the device using their personal device (e.g., mobile phone) in communication with the smart contract in the certificate authority blockchain.

Step 404 of method 400 includes verifying, by the certificate authority, the device digital signature. After receiving the device verification request, the certificate authority is configured to verify the authenticity of the device digital signature. In some examples, the device digital signature that is communicated in the device verification request includes the ciphertext generated by encrypting the device public key with the certificate authority private key, as described above in step 206 of method 200. In such examples, the certificate authority may utilize the certificate authority public key to decrypt the ciphertext and check that the decrypted ciphertext matches the device public key. If the decrypted ciphertext matches the device public key, the authenticity of the device digital signature is verified. In some examples, the decrypted ciphertext (i.e., the device public key) is then checked against the hardware information of the electronic device, to confirm that the device public key was generated based on the hardware information of the electronic device. In some examples, the smart contract deployed to the blockchain for the specific electronic device stores the certificate authority public key and is configured to decrypt the device digital signature ciphertext utilizing the stored certificate authority public key.

Step 406 of method 400 includes verifying, by the certificate authority, the device payload communicated in the device verification request. In some examples, the device payload communicated in the verification request includes information (e.g., a verification expiration timestamp, electronic device serial number, user crypto wallet address, blockchain address, etc.) encrypted with the device private key. In such examples, the certificate authority (e.g., the smart contract deployed to the blockchain) may be configured to decrypt the information utilizing the device public key and check that the information matches expectations. For example, the encrypted payload may include an expiration timestamp of the verification request encrypted with the device private key. The certificate authority may utilize the device public key to decrypt the encrypted payload and determine the expiration timestamp matches expectations based on the time of the verification request. Step 406 facilitates checking that the device public key and device private key match.

Step 408 of method 400 includes communicating, by the certificate authority, the device verification result to the mobile application of the user's personal device. If the authenticity of the device digital signature and device payload are verified in steps 404 and 406, then the certificate authority communicates a positive verification result to the mobile application of the user's device. If authenticity of the device digital signature or the device payload is not verified in one or both of steps 404 and 406, then the certificate authority communicates a negative verification result to the mobile application of the user's personal device. The authentication result may be communicated by the certificate authority to the mobile application of the user's personal device via http requests for discrete batch transfer, and websocket, webRTC for continuous data streaming, and/or in any other suitable manner.

In some examples, if the verification result is positive, the certificate authority checks if a corresponding NFT for the electronic device has previously been minted in the blockchain. If the corresponding NFT for the electronic device has been minted, the certificate authority may communicate stored metadata regarding the electronic controller to the mobile application. For example, the certificate authority may communicate an interplanetary file system (IPFS) link to a visual representation of the minted NFT for the electronic device, device color, type, batch number, etc. In some examples, information regarding the device, color, type, batch number, etc. may be stored in the corresponding device image from the IPFS using steganography. In other words, the metadata regarding the electronic device may be stored in the electronic device's corresponding IPFS images. This facilitates reducing the amount of metadata regarding the electronic device that is stored in the blockchain, thereby reducing the cost of storing the device metadata. The one or more mobile applications may then be able to decode the metadata from the IPFS images.

E. Illustrative method of Minting an NFT for Authenticated Electronic Device

Figure 5:
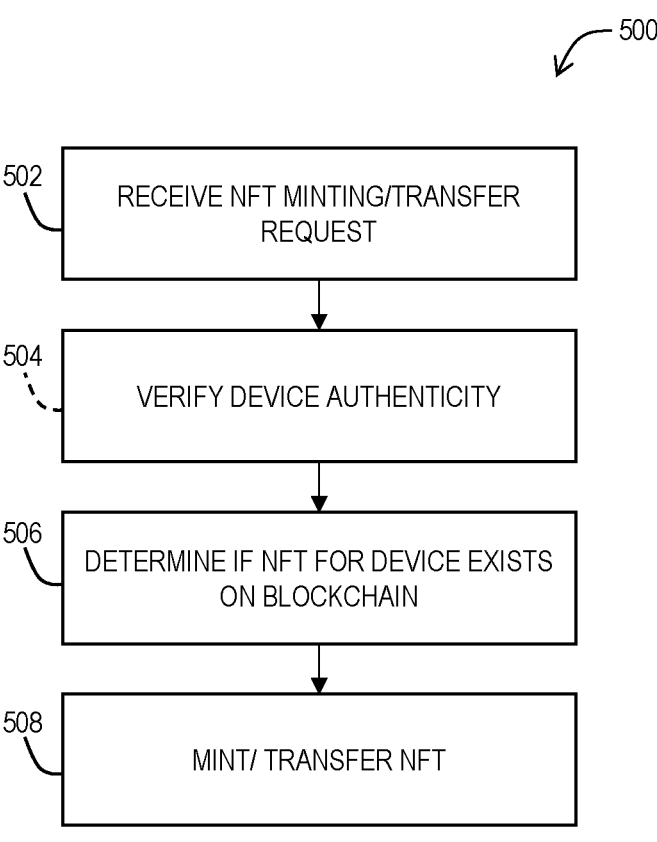
FIG. 5 is a flow chart depicting steps of an illustrative method for minting an NFT associated with an electronic device in accordance with aspects of the present disclosure.

This section describes steps of an illustrative method 500 for minting an NFT for an authenticated device by a cloud-based certificate authority; see FIG. 5. Aspects of device-verification system 100 and methods 200, 300, and 400 may be utilized in the method steps described below. Where appropriate, reference may be made to components and systems that may be used in carrying out each step. These references are for illustration, and are not intended to limit the possible ways of carrying out any particular step of the method.

FIG. 5 is a flowchart illustrating steps performed in an illustrative method, and may not recite the complete process or all steps of the method. Although various steps of method 500 are described below and depicted in FIG. 5, the steps need not necessarily all be performed, and in some cases may be performed simultaneously or in a different order than the order shown.

Step 502 of method 500 includes receiving, by the certificate authority (e.g., certificate authority 106), an NFT minting request or transfer request for an electronic device from a mobile application of a user's personal device (e.g., personal device 108). In some examples, the NFT minting or transfer request is received along with the device verification request received in step 402 of method 400, described above. Thus, along with the NFT minting or transfer request for the electronic device, the certificate authority receives information that can be utilized by the certificate authority to verify the authenticity of the electronic device. For example, the certificate authority may receive the device hardware information, device digital signature cyphertext (e.g., device public key encrypted with certificate authority private key), device public and private keys, and/or the encrypted payload.

Step 504 of method 500 includes verifying, by the certificate authority, the authenticity of the electronic device. The certificate authority may verify the authenticity of the electronic device utilizing the steps of method 400, described above with reference to FIG. 4. Specifically, the certificate authority may verify the authenticity of the device digital signature and the device private key signed payload.

Step 506 of method 500 includes determining, by the certificate authority, if a corresponding NFT already exists for the electronic device authenticated in step 504 of method 500. In some examples, determining if the corresponding NFT already has been minted includes checking the address in the blockchain corresponding to the specific electronic device authenticated in step 504. For example, minting of the NFT may occur via the smart contract deployed to the blockchain for each manufactured and/or sold device. In some examples, the address is communicated to the certificate authority in the encrypted payload.

Step 508 of method 500 includes minting or transferring the corresponding NFT for the electronic device authenticated in step 504. In some examples, if the certificate authority determines in step 506 that the corresponding NFT for the authenticated electronic device has not already been minted, then the certificate authority mints the corresponding NFT for the electronic device, e.g., utilizing the smart contract deployed to the blockchain for the electronic device. If the certificate authority determines in step 506 that the corresponding NFT has already been minted, then the certificate authority may communicate that the NFT has already been minted to the mobile application of the user's personal device.

In some examples, when the electronic device is sold to a new user, step 508 includes transferring the corresponding NFT to the crypto wallet of the new user. In such examples, the certificate authority may receive in the encrypted payload in step 502, a crypto wallet address of the new user. If the corresponding NFT for the authenticated electronic device has already been minted, the certificate authority transfers the corresponding NFT to the crypto wallet of the new user after the device authenticity is verified in step 504.

In some examples, after the corresponding NFT is minted or transferred, the certificate authority communicates the result to the mobile application of the user's personal device. In some examples, the certificate authority communicates metadata associated with the electronic device and/or an IPFS link to a visual representation of the minted or transferred NFT for the device. In some examples, the metadata is stored in the image at the IPFS link using steganography. In such examples, the mobile application on the user's personal device may fetch the image from the IPFS link and decode the metadata from the image.

F. Illustrative Data Processing System

Figure 6:
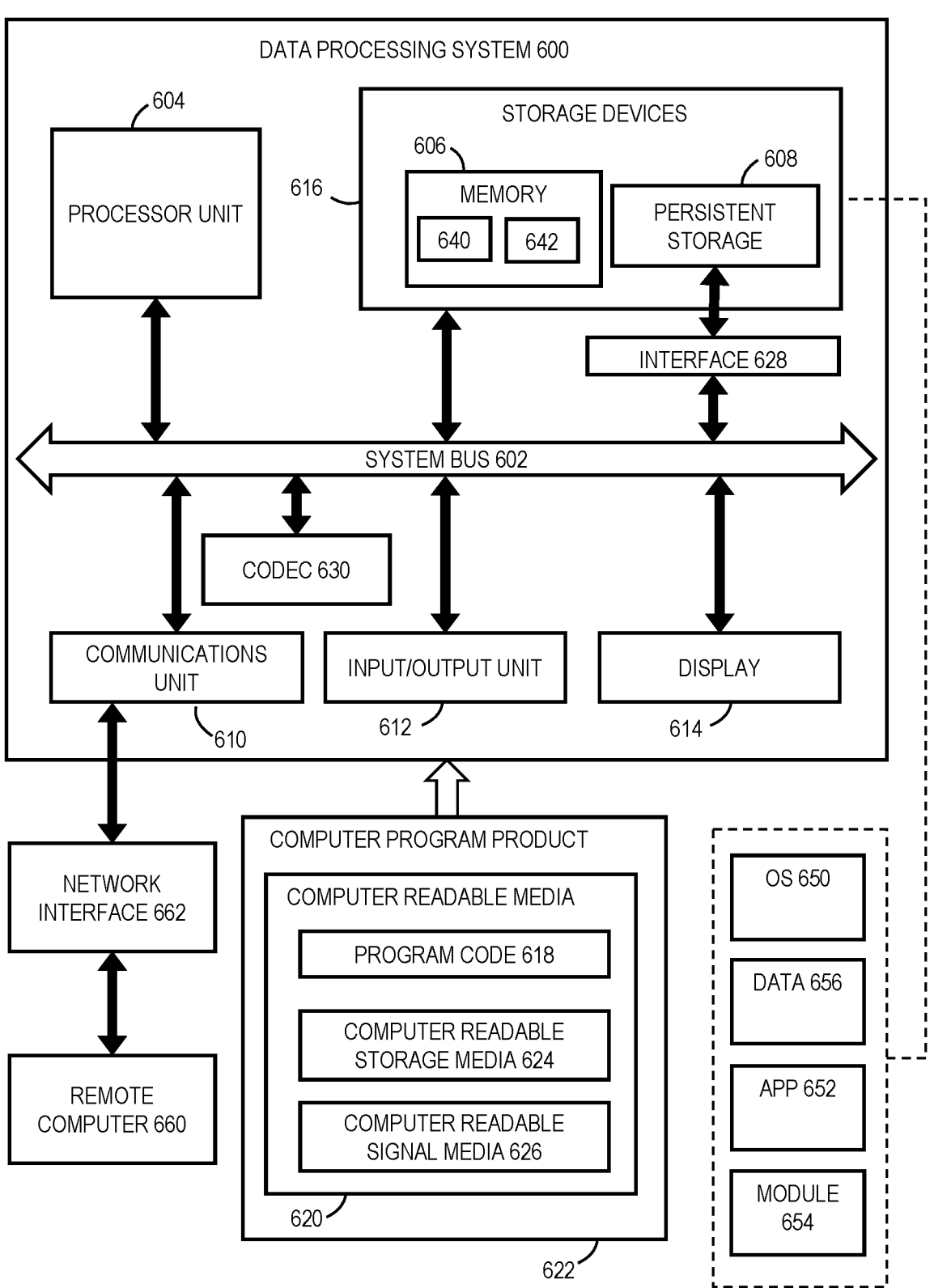
FIG. 6 is a schematic diagram of an illustrative data processing system in accordance with aspects of the present disclosure.

As shown in FIG. 6, this example describes a data processing system 600 (also referred to as a computer, computing system, and/or computer system) in accordance with aspects of the present disclosure. In this example, data processing system 600 is an illustrative data processing system suitable for implementing aspects of the device-verification systems and methods. More specifically, in some examples, devices that are embodiments of data processing systems (e.g., smartphones, tablets, personal computers) may be utilized in the device-verification system and methods described above. For example, electronic device 102 and/or personal device 108 may comprise a device that is an embodiment of data processing systems.

In this illustrative example, data processing system 600 includes a system bus 602 (also referred to as communications framework). System bus 602 may provide communications between a processor unit 604 (also referred to as a processor or processors), a memory 606, a persistent storage 608, a communications unit 610, an input/output (I/O) unit 612, a codec 630, and/or a display 614. Memory 606, persistent storage 608, communications unit 610, input/output (I/O) unit 612, display 614, and codec 630 are examples of resources that may be accessible by processor unit 604 via system bus 602.

Processor unit 604 serves to run instructions that may be loaded into memory 606. Processor unit 604 may comprise a number of processors, a multi-processor core, and/or a particular type of processor or processors (e.g., a central processing unit (CPU), graphics processing unit (GPU), etc.), depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device may include any suitable hardware capable of storing information (e.g., digital information), such as data, program code in functional form, and/or other suitable information, either on a temporary basis or a permanent basis.

Storage devices 616 also may be referred to as computer-readable storage devices or computer-readable media. Memory 606 may include a volatile storage memory 640 and a non-volatile memory 642. In some examples, a basic input/output system (BIOS), containing the basic routines to transfer information between elements within the data processing system 600, such as during start-up, may be stored in non-volatile memory 642. Persistent storage 608 may take various forms, depending on the particular implementation.

Persistent storage 608 may contain one or more components or devices. For example, persistent storage 608 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 608 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 608 to system bus 602, a removable or non-removable interface is typically used, such as interface 628.

Input/output (I/O) unit 612 allows for input and output of data with other devices that may be connected to data processing system 600 (i.e., input devices and output devices). For example, an input device may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 604 through system bus 602 via interface port(s). Suitable interface port(s) may include, for example, a serial port, a parallel port, a game port, and/or a universal serial bus (USB).

One or more output devices may use some of the same types of ports, and in some cases the same actual ports, as the input device(s). For example, a USB port may be used to provide input to data processing system 600 and to output information from data processing system 600 to an output device. One or more output adapters may be provided for certain output devices (e.g., monitors, speakers, and printers, among others) which require special adapters. Suitable output adapters may include, e.g. video and sound cards that provide a means of connection between the output device and system bus 602. Other devices and/or systems of devices may provide both input and output capabilities, such as remote computer(s) 660. Display 614 may include any suitable human-machine interface or other mechanism configured to display information to a user, e.g., a CRT, LED, or LCD monitor or screen, etc.

Communications unit 610 refers to any suitable hardware and/or software employed to provide for communications with other data processing systems or devices. While communication unit 610 is shown inside data processing system 600, it may in some examples be at least partially external to data processing system 600. Communications unit 610 may include internal and external technologies, e.g., modems (including regular telephone grade modems, cable modems, and DSL modems), ISDN adapters, and/or wired and wireless Ethernet cards, hubs, routers, etc. Data processing system 600 may operate in a networked environment, using logical connections to one or more remote computers 660. A remote computer(s) 660 may include a personal computer (PC), a server, a router, a network PC, a workstation, a microprocessor-based appliance, a peer device, a smart phone, a tablet, another network note, and/or the like. Remote computer(s) 660 typically include many of the elements described relative to data processing system 600. Remote computer(s) 660 may be logically connected to data processing system 600 through a network interface 662 which is connected to data processing system 600 via communications unit 610. Network interface 662 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 630 may include an encoder, a decoder, or both, comprising hardware, software, or a combination of hardware and software. Codec 630 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 630 is depicted as a separate component, codec 630 may be contained or implemented in memory, e.g., non-volatile memory 642.

Non-volatile memory 642 may include read only memory (ROM), programmable ROM (PROM), electrically programmable ROM (EPROM), electrically erasable programmable ROM (EEPROM), flash memory, and/or the like, or any combination of these. Volatile memory 640 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 616, which are in communication with processor unit 604 through system bus 602. In these illustrative examples, the instructions are in a functional form in persistent storage 608. These instructions may be loaded into memory 606 for execution by processor unit 604. Processes of one or more embodiments of the present disclosure may be performed by processor unit 604 using computer-implemented instructions, which may be located in a memory, such as memory 606.

These instructions are referred to as program instructions, program code, computer usable program code, or computer-readable program code executed by a processor in processor unit 604. The program code in the different embodiments may be embodied on different physical or computer-readable storage media, such as memory 606 or persistent storage 608. Program code 618 may be located in a functional form on computer-readable media 620 that is selectively removable and may be loaded onto or transferred to data processing system 600 for execution by processor unit 604. Program code 618 and computer-readable media 620 form computer program product 622 in these examples. In one example, computer-readable media 620 may comprise computer-readable storage media 624 or computer-readable signal media 626.

Computer-readable storage media 624 may include, for example, an optical or magnetic disk that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory, that is connected to data processing system 600. In some instances, computer-readable storage media 624 may not be removable from data processing system 600.

In these examples, computer-readable storage media 624 is a non-transitory, physical or tangible storage device used to store program code 618 rather than a medium that propagates or transmits program code 618. Computer-readable storage media 624 is also referred to as a computer-readable tangible storage device or a computer-readable physical storage device. In other words, computer-readable storage media 624 is media that can be touched by a person.

Alternatively, program code 618 may be transferred to data processing system 600, e.g., remotely over a network, using computer-readable signal media 626. Computer-readable signal media 626 may be, for example, a propagated data signal containing program code 618. For example, computer-readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer-readable signal media 626 for use within data processing system 600. For instance, program code stored in a computer-readable storage medium in a server data processing system may be downloaded over a network from the server to data processing system 600. The computer providing program code 618 may be a server computer, a client computer, or some other device capable of storing and transmitting program code 618.

In some examples, program code 618 may comprise an operating system (OS) 650. Operating system 650, which may be stored on persistent storage 608, controls and allocates resources of data processing system 600. One or more applications 652 take advantage of the operating system's management of resources via program modules 654, and program data 656 stored on storage devices 616. OS 650 may include any suitable software system configured to manage and expose hardware resources of computer 600 for sharing and use by applications 652. In some examples, OS 650 provides application programming interfaces (APIs) that facilitate connection of different type of hardware and/or provide applications 652 access to hardware and OS services. In some examples, certain applications 652 may provide further services for use by other applications 652, e.g., as is the case with so-called "middleware." Aspects of present disclosure may be implemented with respect to various operating systems or combinations of operating systems.

The different components illustrated for data processing system 600 are not meant to provide architectural limitations to the manner in which different embodiments may be implemented. One or more embodiments of the present disclosure may be implemented in a data processing system that includes fewer components or includes components in addition to and/or in place of those illustrated for computer 600. Other components shown in FIG. 6 can be varied from the examples depicted. Different embodiments may be implemented using any hardware device or system capable of running program code. As one example, data processing system 600 may include organic components integrated with inorganic components and/or may be comprised entirely of organic components (excluding a human being). For example, a storage device may be comprised of an organic semiconductor.

In some examples, processor unit 604 may take the form of a hardware unit having hardware circuits that are specifically manufactured or configured for a particular use, or to produce a particular outcome or progress. This type of hardware may perform operations without needing program code 618 to be loaded into a memory from a storage device to be configured to perform the operations. For example, processor unit 604 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 618) may be implemented as hardware, e.g., by specifying an FPGA configuration using a hardware description language (HDL) and then using a resulting binary file to (re)configure the FPGA.

In another example, data processing system 600 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, system bus 602 may comprise one or more buses, such as a system bus or an input/output bus. Of course, the bus system may be implemented using any suitable type of architecture that provides for a transfer of data between different components or devices attached to the bus system. System bus 602 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 610 may include a number of devices that transmit data, receive data, or both transmit and receive data. Communications unit 610 may be, for example, a modem or a network adapter, two network adapters, or some combination thereof. Further, a memory may be, for example, memory 606, or a cache, such as that found in an interface and memory controller hub that may be present in system bus 602.

G. Illustrative Distributed Data Processing System

Figure 7:
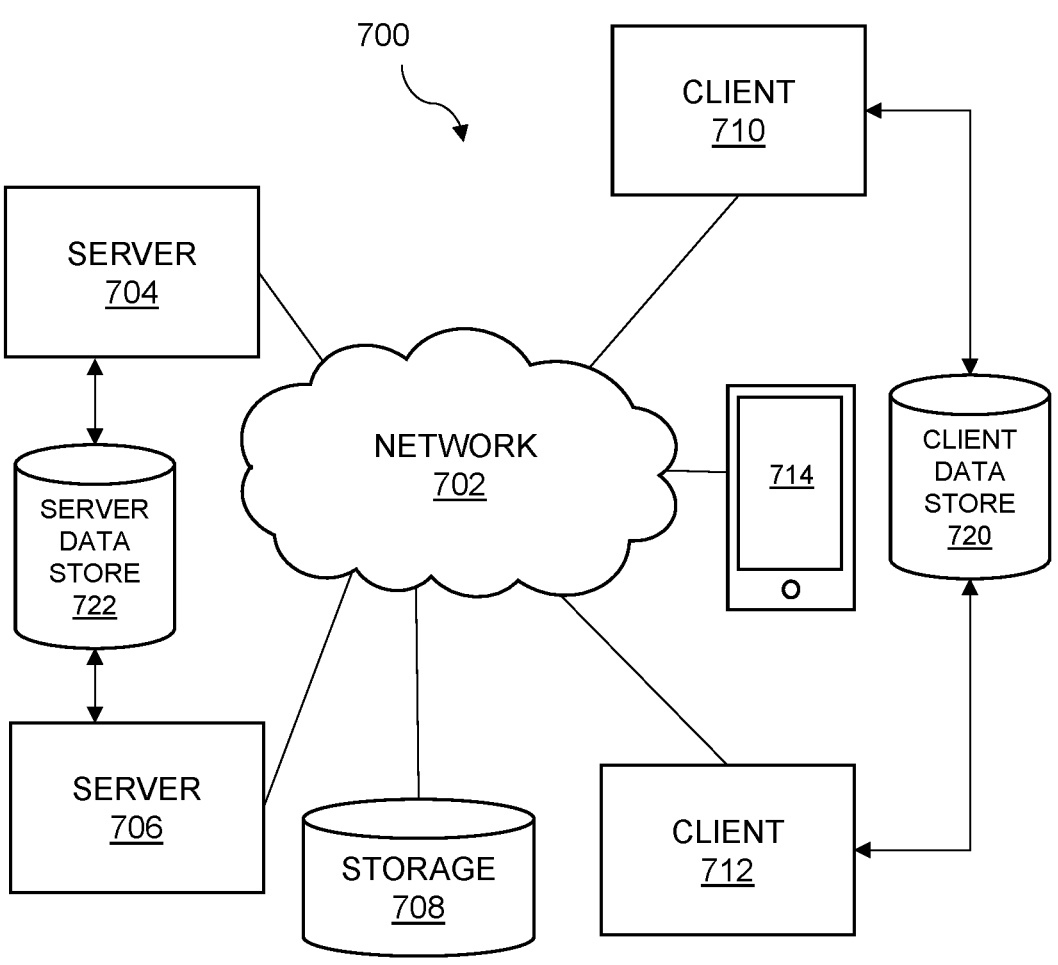
FIG. 7 is a schematic diagram of an illustrative network data processing system in accordance with aspects of the present disclosure.

As shown in FIG. 7, this example describes a general network data processing system 700, interchangeably termed a computer network, a network system, a distributed data processing system, or a distributed network, aspects of which may be included in one or more illustrative embodiments of the device-verification systems of the present disclosure. For example, a computer network is utilized to facilitate communication between personal electronic device 108 (e.g., client device 712) and cloud-based certificate authority 106 (e.g., server 704) in device-verification system 100, described above with reference to FIG. 1.

It should be appreciated that FIG. 7 is provided as an illustration of one implementation and is not intended to imply any limitation with regard to environments in which different embodiments may be implemented. Many modifications to the depicted environment may be made.

Network system 700 is a network of devices (e.g., computers), each of which may be an example of data processing system 700, and other components. Network data processing system 700 may include network 702, which is a medium configured to provide communications links between various devices and computers connected within network data processing system 700. Network 702 may include connections such as wired or wireless communication links, fiber optic cables, and/or any other suitable medium for transmitting and/or communicating data between network devices, or any combination thereof.

In the depicted example, a first network device 704 and a second network device 706 connect to network 702, as do one or more computer-readable memories or storage devices 708. Network devices 704 and 706 are each examples of data processing system 600, described above. In the depicted example, devices 704 and 706 are shown as server computers, which are in communication with one or more server data store(s) 722 that may be employed to store information local to server computers 704 and 706, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 710 and 712 and/or a client smart device 714, may connect to network 702. Each of these devices is an example of data processing system 600, described above regarding FIG. 6. Client electronic devices 710, 712, and 714 may include, for example, one or more personal computers, network computers, and/or mobile computing devices such as personal digital assistants (PDAs), smart phones, handheld gaming devices, wearable devices, and/or tablet computers, and the like. In the depicted example, server 704 provides information, such as boot files, operating system images, and applications to one or more of client electronic devices 710, 712, and 714. Client electronic devices 710, 712, and 714 may be referred to as "clients" in the context of their relationship to a server such as server computer 704. Client devices may be in communication with one or more client data store(s) 720, which may be employed to store information local to the clients (e.g., cookie(s) and/or associated contextual information). Network data processing system 700 may include more or fewer servers and/or clients (or no servers or clients), as well as other devices not shown.

In some examples, first client electric device 710 may transfer an encoded file to server 704. Server 704 can store the file, decode the file, and/or transmit the file to second client electric device 712. In some examples, first client electric device 710 may transfer an uncompressed file to server 704 and server 704 may compress the file. In some examples, server 704 may encode text, audio, and/or video information, and transmit the information via network 702 to one or more clients.

Client smart device 714 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 700 may be stored in or on a computer-readable storage medium, such as network-connected storage device 708 and/or a persistent storage 708 of one of the network computers, as described above, and may be downloaded to a data processing system or other device for use. For example, program code may be stored on a computer-readable storage medium on server computer 704 and downloaded to client 710 over network 702, for use on client 710. In some examples, client data store 720 and server data store 722 reside on one or more storage devices 708 and/or 708.

Network data processing system 700 may be implemented as one or more of different types of networks. For example, system 700 may include an intranet, a local area network (LAN), a wide area network (WAN), or a personal area network (PAN). In some examples, network data processing system 700 includes the Internet, with network 702 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 702 may be referred to as a "cloud." In those examples, each server 704 may be referred to as a cloud computing node, and client electronic devices may be referred to as cloud consumers, or the like.

FIG. 7 is intended as an example, and not as an architectural limitation for any illustrative embodiments.

H. Illustrative Combinations and Additional Examples

This section describes additional aspects and features of device-verification systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A system for verifying the authenticity of a first electronic device, the system comprising:
a certificate authority comprising a server; and
a second electronic device including:
 one or more processors;
 a memory;
 a near field communication (NFC) reader configured to read hardware information, a device public key, a device private key, and a digital signature from an NFC tag of the first electronic device; and
 a software application including a plurality of instructions stored in the memory and executable by the one or more processors to:
  compare the device private key to the hardware information; and
  in response to the device private key matching the hardware information, communicate a device verification request to the certificate authority, the device verification request including the digital signature;
wherein the certificate authority comprises processing logic configured to receive the verification request, verify the digital signature of the first electronic device, and communicate a verification result to the software application of the second electronic device based on the verification of the digital signature.

A1. The system of paragraph A0, wherein the digital signature includes a ciphertext generated by encrypting the device public key with a certificate authority private key.

A2. The system of paragraph A1, wherein verifying the digital signature includes utilizing a certificate authority public key to decrypt the ciphertext and checking if the decrypted ciphertext matches the device public key.

A3. The system of any one of paragraphs A0-A2, wherein the certificate authority includes a distributed system configured to store information corresponding to the first electronic device.

A4. The system of paragraph A3, wherein the distributed system comprises a blockchain ledger.

A5. The system of paragraph A4, wherein a smart contract is deployed to the blockchain ledger for the first electronic device, wherein the smart contract is configured to verify the digital signature of the first electronic device.

A6. The system of paragraph A5, wherein the smart contract, in response to positively verifying the digital signature of the first electronic device, is configured to mint a non-fungible token (NFT) for the first electronic device in the blockchain.

A7. The system of paragraph A6, wherein the NFT is configured to store credential data of the first electronic device and a link to one or more images of the NFT for the first electronic device.

A8. The system of paragraph A3, wherein the distributed system includes a peer-to-peer network.

A9. The system of paragraph A8, wherein the peer-to-peer network includes an interplanetary file system (IPFS) storing one or more images of the first electronic device.

A10. The system of any one or paragraphs A0-A9, wherein the device verification request further includes a payload encrypted with the device private key.

A11. The system of paragraph A10, wherein the payload includes a user wallet address, a blockchain address of a smart contract associated with the first electronic device, and a request expiration timestamp.

A12. The system of paragraph A11, wherein the certificate authority is further configured to decrypt the payload using the device public key, and check that the user wallet address, blockchain address, and request expiration timestamp each match expected values.

B0. A method of verifying the authenticity of a first electronic device, the method comprising:

receiving, by a certificate authority, a device verification request for a first electronic device from a mobile application of a user's personal device, the device verification request including a digital signature of the first electronic device and a payload encrypted with a device private key;

verifying, by the certificate authority, the authenticity of the digital signature;

decrypting, by the certificate authority, the payload utilizing a device public key;

verifying, by the certificate authority, the decrypted payload matches an expected value; and in response to positively verifying the authenticity of the digital signature and that the decrypted payload matches the expected value, communicating a positive verification result to the mobile application.

B1. The method of paragraph B0, wherein the digital signature includes a ciphertext generated by encrypting the device public key with a certificate authority private key; and wherein verifying the digital signature includes utilizing a certificate authority public key to decrypt the ciphertext and determining if the decrypted ciphertext matches the device public key.

B2. The method of any one of paragraphs B0-B1, further comprising in response to positively verifying the authenticity of the digital signature and that the decrypted payload matches the expected value, communicating, to the mobile application, an interplanetary file system (IPFS) link to a corresponding image of the first electronic device to the mobile application.

B3. The method of paragraph B2, wherein the corresponding image stores metadata related to the first electronic device.

B4. The method of any one of paragraphs B0-B3, wherein the certificate authority includes a blockchain ledger and a smart contract deployed to the blockchain ledger for the first electronic device, wherein the smart contract is configured to verify the digital signature.

B5. The method of any one of paragraphs B0-B4, further comprising in response to verifying the digital signature, minting a non-fungible token (NFT) corresponding to the first electronic device in the blockchain.

B6. The method of any one of paragraphs B5, wherein the NFT stores an interplanetary file system (IPFS) link to a visual presentation of the first electronic device and credential data of the first electronic device.

Advantages, Features, and Benefits

The different embodiments and examples of the device-verification systems described herein provide several advantages over known solutions for verifying electronic device authenticity. For example, illustrative embodiments and examples described herein allow for the device verification process to be directly tied to unique identifiers of the device hardware, thereby resulting in a more accurate verification that prevents spoofing and false positive verification results.

Additionally, and among other benefits, illustrative embodiments and examples described herein allow for the verification of an electronic device to occur wirelessly, through the use of ubiquitous, non-specialized personal devices (e.g., a smartphone).

Additionally, and among other benefits, illustrative embodiments and examples described herein allow for the secure storage and retrieval of device metadata.

Additionally, and among other benefits, illustrative embodiments and examples described herein allow for the storage and retrieval of device images.

Additionally, and among other benefits, illustrative embodiments and examples described herein allow for the minting and transferring of a corresponding NFT associated with the electronic device.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A system for verifying an authenticity of a first electronic device, the system comprising:
   a certificate authority comprising a server; and
   a second electronic device including:
      one or more processors;
      a memory;
      a near field communication (NFC) reader configured to read hardware information, a device public key, a device private key, and a digital signature from an NFC tag of the first electronic device, wherein the device public key and the device private key are each generated based on a unique identifier (UID) of the NFC tag of the first electronic device; and
      a software application including a plurality of instructions stored in the memory and executable by the one or more processors to:
         determine whether the device private key matches the hardware information by comparing the device private key to the hardware information; and
         in response to determining the device private key matches the hardware information, communicate a device verification request to the certificate authority, the device verification request including the digital signature;
      wherein the certificate authority comprises processing logic configured to receive the device verification request, verify the digital signature of the first electronic device, and communicate a verification result to the software application of the second electronic device based on the verification of the digital signature.

2. The system of claim 1, wherein the digital signature includes a ciphertext generated by encrypting the device public key with a certificate authority private key.

3. The system of claim 2, wherein verifying the digital signature includes utilizing a certificate authority public key to decrypt the ciphertext, and wherein the digital signature is positively verified in response to the decrypted ciphertext matching the device public key.

4. The system of claim 1, wherein the certificate authority includes a distributed system configured to store metadata corresponding to the first electronic device.

5. The system of claim 4, wherein the distributed system comprises a blockchain ledger, and wherein a smart contract is deployed to the blockchain ledger for the first electronic device and the smart contract is configured to verify the digital signature of the first electronic device.

6. The system of claim 5, wherein the smart contract, in response to positively verifying the digital signature of the first electronic device, is configured to mint a non-fungible token (NFT) for the first electronic device in the blockchain ledger.

7. The system of claim 6, wherein the NFT is configured to store credential data of the first electronic device and a link to one or more images of the first electronic device.

8. The system of claim 4, wherein the distributed system includes a peer-to-peer network.

9. The system of claim 8, wherein the peer-to-peer network includes an interplanetary file system (IPFS) storing one or more images of the first electronic device.

10. The system of claim 1, wherein the device verification request further includes a payload encrypted with the device private key.

11. The system of claim 10, wherein the payload includes a user wallet address, a blockchain address of a smart contract associated with the first electronic device, and a request expiration timestamp.

12. The system of claim 11, wherein the certificate authority is further configured to decrypt the payload using the device public key, and check that the user wallet address, blockchain address, and request expiration timestamp each match expected values.

13. A method of verifying an authenticity of a first electronic device, the method comprising:
   receiving, by a certificate authority, a device verification request for a first electronic device from a mobile application of a user's personal device, the device verification request including a digital signature of the first electronic device and a payload encrypted with a device private key, wherein the certificate authority includes a blockchain ledger and a plurality of smart contracts each deployed to a respective blockchain address on the blockchain ledger, wherein each smart contract of the plurality of smart contracts is associated with a different electronic device;
   verifying the digital signature of the first electronic device by a first-device smart contract of the plurality of smart contracts of the certificate authority, wherein the first-device smart contract is specific to the first electronic device;
   decrypting, by the certificate authority, the payload utilizing a device public key, wherein the device public key and the device private key are each generated based on a unique identifier (UID) of an NFC tag of the first electronic device;
   verifying, by the certificate authority, the decrypted payload matches an expected value; and
   in response to positively verifying the authenticity of the digital signature and that the decrypted payload matches the expected value, communicating a positive verification result to the mobile application.

14. The method of claim 13, wherein the digital signature includes a ciphertext generated by encrypting the device public key with a certificate authority private key; and
   wherein verifying the digital signature includes utilizing a certificate authority public key to decrypt the ciphertext and positively verifying the digital signature in response to the decrypted ciphertext matching the device public key.

15. The method of claim 13, further comprising:
   in response to positively verifying the digital signature and that the decrypted payload matches the expected value, communicating to the mobile application an interplanetary file system (IPFS) link to a corresponding image of the first electronic device.

16. The method of claim 15, wherein the corresponding image stores metadata related to the first electronic device.

17. The method of claim 13, further comprising in response to verifying the digital signature, minting a non-fungible token (NFT) corresponding to the first electronic device in the blockchain ledger.

18. The method of claim 17, wherein the NFT stores an interplanetary file system (IPFS) link to a visual representation of the first electronic device and metadata of the first electronic device.

19. The method of claim 13, wherein the payload includes the respective blockchain address of the first-device smart contract of the certificate authority, and wherein the method further comprises:

decrypting, by the certificate authority, the payload utilizing the device public key to determine the respective blockchain address of the first-device smart contract of the certificate authority; and transmitting, by the certificate authority, the digital sig- nature of the first electronic device to the respective blockchain address of the first-device smart contract, wherein the first-device smart contract is configured to verify the digital signature in response to receiving the digital signature.

* * * * *